United States Patent [19]

Richards et al.

[11] Patent Number: 5,580,217
[45] Date of Patent: Dec. 3, 1996

[54] GAS TURBINE ENGINE FAN BLADE ASSEMBLY

[75] Inventors: Martyn Richards, Derby; David S. Knott, Leicestershire, both of England

[73] Assignee: Rolls-Royce plc, London, England

[21] Appl. No.: 404,152

[22] Filed: Mar. 14, 1995

[30] Foreign Application Priority Data

Mar. 19, 1994 [GB] United Kingdom .................. 9405473

[51] Int. Cl.$^6$ ........................................ F01D 5/22
[52] U.S. Cl. ........................................ 416/193 A
[58] Field of Search ................. 416/193 A, 219 R, 416/220 R

[56] References Cited

U.S. PATENT DOCUMENTS

| | | | |
|---|---|---|---|
| 3,008,689 | 11/1961 | Morley et al. | 416/193 A |
| 3,047,268 | 7/1962 | Leavitt | 416/220 R |
| 3,294,364 | 12/1966 | Stanley . | |
| 3,393,862 | 7/1968 | Harrison . | |
| 5,257,908 | 11/1993 | Ortolano . | |
| 5,263,823 | 11/1993 | Cabaret et al. | 416/220 R |
| 5,281,096 | 1/1994 | Harris et al. | 416/193 A |

FOREIGN PATENT DOCUMENTS

| | | | |
|---|---|---|---|
| 989556 | 9/1951 | France | 416/193 A |
| 2120470 | 11/1971 | Germany . | |
| 710119 | 6/1954 | United Kingdom . | |
| 1232506 | 5/1971 | United Kingdom . | |
| 1331209 | 9/1973 | United Kingdom . | |
| 2006883 | 5/1979 | United Kingdom . | |
| 2257755 | 1/1993 | United Kingdom . | |
| 93/21425 | 10/1993 | WIPO | 416/220 R |

*Primary Examiner*—James Larson
*Attorney, Agent, or Firm*—Cushman Darby & Cushman, L.L.P.

[57] ABSTRACT

A stage of fan blades in a ducted fan gas turbine engine have the spaces between them filled by a rotary annulus wall filler which has a leading portion made from metal and a trailing portion made from a composite material. The metal portion resists the impact damage from the ingress of foreign bodies and the trailing portion provides a lighter structure.

6 Claims, 2 Drawing Sheets

GAS TURBINE ENGINE FAN BLADE ASSEMBLY

FIELD OF THE INVENTION

The present invention relates to a gas turbine engine fan blade assembly. More specifically, the invention relates to annulus wall fillers, these being members which are positioned one between each adjacent pair of fan blades.

BACKGROUND OF THE INVENTION

Until recent times it was the practice to produce rotary blades, both fan and first stage compressor blades, with integral platforms. The relevant art is well known and will not be enlarged upon hereinafter. The mode of manufacture meant that blade and platform were of common, integral material and moreover, necessitated considerable working to achieve the platform shape.

Recent design trends have led to the obviation of integral blade/platform construction, at least in the design of ducted fans, and the inclusion of separate annulus fillers, which have their own features for removably locating them on the fan disc rim. Advantages afforded by such design are relative simplicity of manufacture, use of metals or other materials, e.g. composites, which are lighter than the blade metal, and easy replacement of damaged fillers. As regards the latter, damage to the platform of an integral blade/platform construction often meant replacing the whole.

Most damage incurred by the fan or first stage compressor structure immediately downstream of the fan is the result of the ingress of foreign objects, i.e. objects which range from birds to hailstones, and composite and lightweight metal parts tend to suffer more than heavier metal parts.

SUMMARY OF THE INVENTION

The present invention seeks to provide an improved rotary annulus wall filler for a gas turbine engine.

According to the present invention, a gas turbine engine fan blade assembly comprises a rotary disc carrying an annular array of radially extending fan blades and a plurality of annulus wall fillers, one annular wall filler being interposed between adjacent fan blades, each annulus wall filler comprising a leading portion which is integral with said disc so that said disc and said leading portion define a unitary structure and a lightweight trailing portion which is attached to said disc.

BRIEF DESCRIPTION OF THE DRAWINGS

The invention will now be described, by way of example and with reference to the accompanying drawings in which:

FIG. 2A is an enlarged part cross sectional view of a fan blade, annulus filler and fan disc of the engine in FIG. 1.

DETAILED DESCRIPTION OF THE INVENTION

Figure 1:
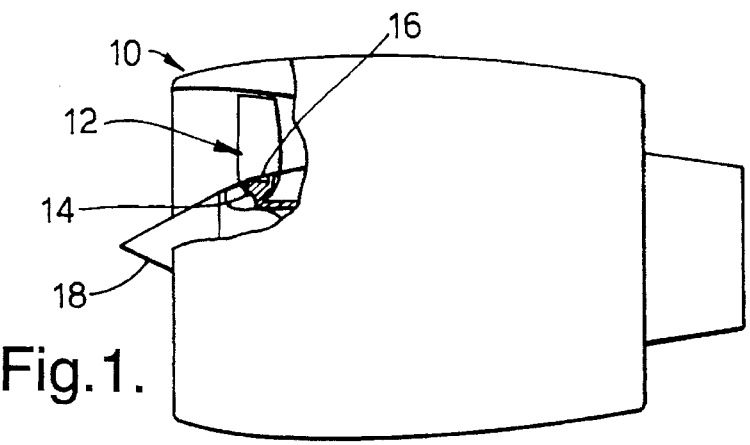
FIG. 1 is a diagrammatic view of a ducted fan gas turbine engine incorporating annulus fillers in accordance with the present invention.

Referring to FIG. 1. A ducted fan gas turbine engine 10 has a stage of fan blades 12 spaced about the rim of a fan disc 14. Each blade 12 is separated from the next by an annulus filler 16. A rotary spinner 18 is fixed to the disc 14 in a suitable manner (not shown) for co-rotation therewith.

Referring now to FIG. 2A. The leading portion 16a of the annulus filler 16 is formed integrally with the disc 14. By leading is meant with respect to the flow of air through the fan duct during operation of the engine 10.

The trailing portion 16b of the annulus filler 16 is made from a composite material (a resin impregnated fibrous material) and is fixed via a flange 19 to an annular flange 20 formed as a radial extension to the rear face of the disc 14. The mode of fixing, which is merely by way of example, includes setscrews 22 which enables rapid disassembly of the structure.

The leading edge of the portion 16b locates under the trailing edge of the portion 16a, and the trailing edge of the portion 16b locates under the leading edge of structure immediately downstream thereof.

Figures 2, 4:
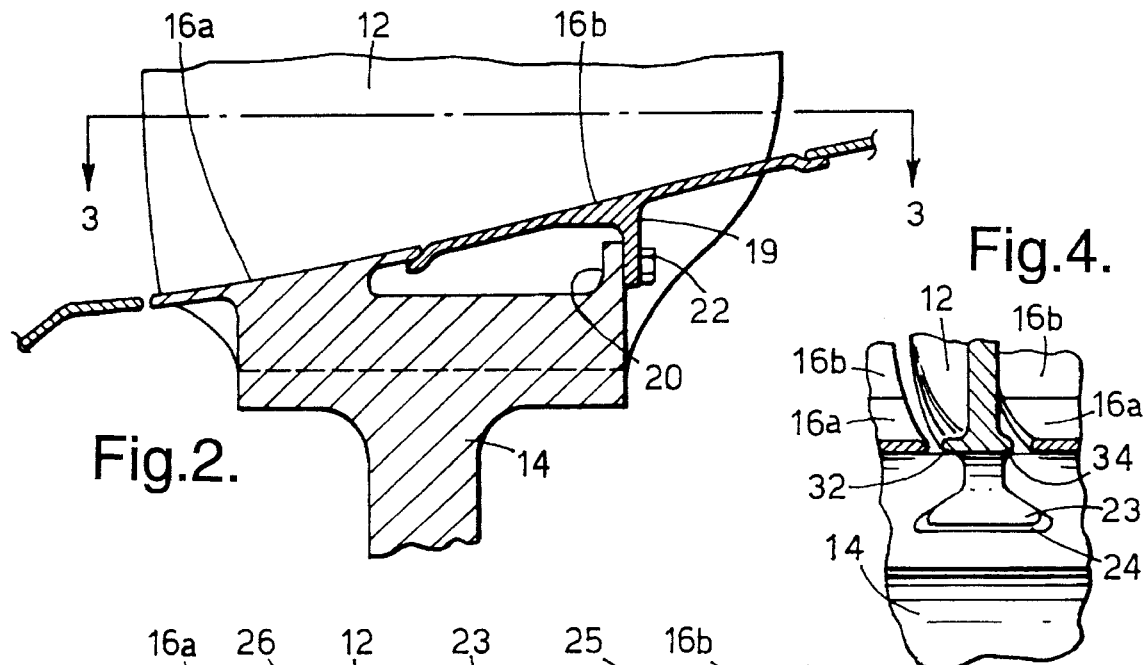
FIG. 4 is a view on line 4—4 in FIG. 3.
Figure 3:
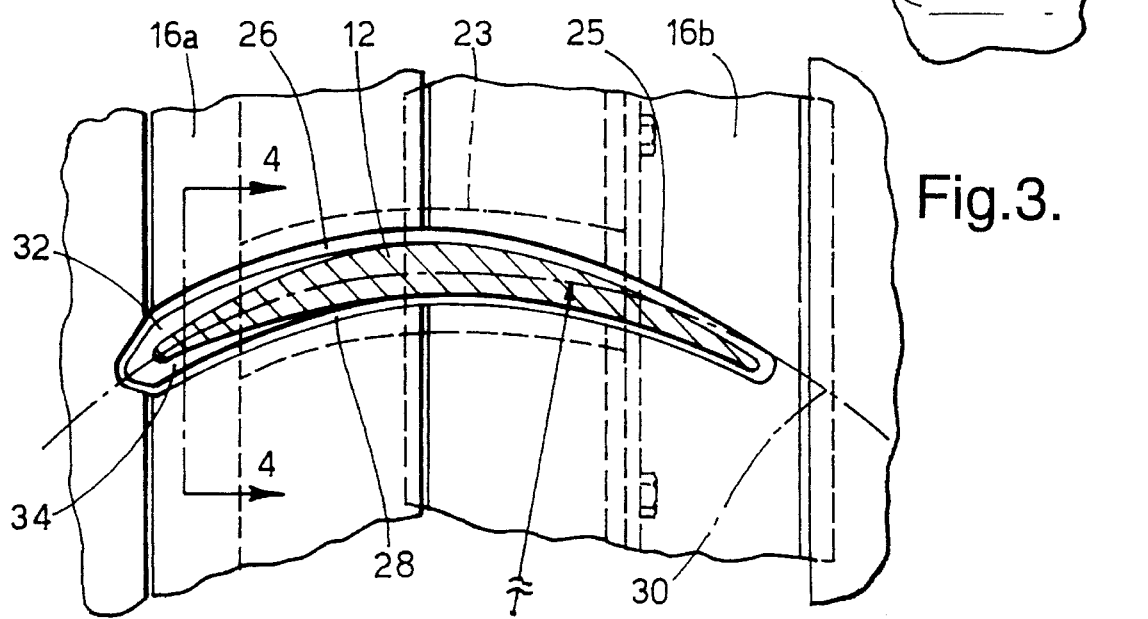
FIG. 3 is a view on line 3—3 in FIG. 2A.

Referring to FIG. 3, each blade 12 has a dovetail root 23 (FIG. 4) the length of which is truly arcuate in form (FIG. 3). This is known per se. Each blade root 23 is slid into a respective complimentary groove 24 (FIG. 4) in the rim of the disc 14, and held there by any convenient, known means (not shown).

Respective clearance 26, 28 are provided between the blades 12 and adjacent leading and trailing annulus fillers 16a, 16b, so that either the blades 12 or the portions 16a, 16b, can be removed from the disc 14, in a direction generally axially of the engine 10.

As illustrated in FIG. 3, the trailing portions 16b consist of a flanged cylinder which has appropriately shaped cutouts 25 in it for the receipt of the trailing portions of the blades 12. However the trailing filler portions 16b could consist of separate members, e.g. firstly produced as the flanged cylinder as described immediately hereinbefore, and then divided, preferably but not necessarily, along a line 30 which is an extension of the mean chord of the blade 12 at a position where it passes through the portion 16b.

The magnitude of the clearance 26, 28 is determined partly by the path which the trailing edge of the blade 12 will follow, when the blade 12 is fitted to or removed from the disc 14, and will be such as to avoid fouling between the respective parts.

Stub platforms 32, 34 are provided along the leading portion of the blade 12, so as to form a profile which being followed by the adjacent edges of the portion 16a, provides a sealable gap in the portions 16a which gap is sufficiently wide as to enable withdrawal of the blade 12 per se from the disc 14.

The stub platforms could be extended for the full lengths of the flanks of the blades 12, and their profile and extent of projection each side of their respective blades 10 would be governed by the paths traced by inter alia the extreme trailing edges of the respective blades 12 during the relative movement. This arrangement would allow smaller clearance gaps and would facilitate undersurface sealing between blades and fillers, a feature which again is known per se.

Figure 2B:
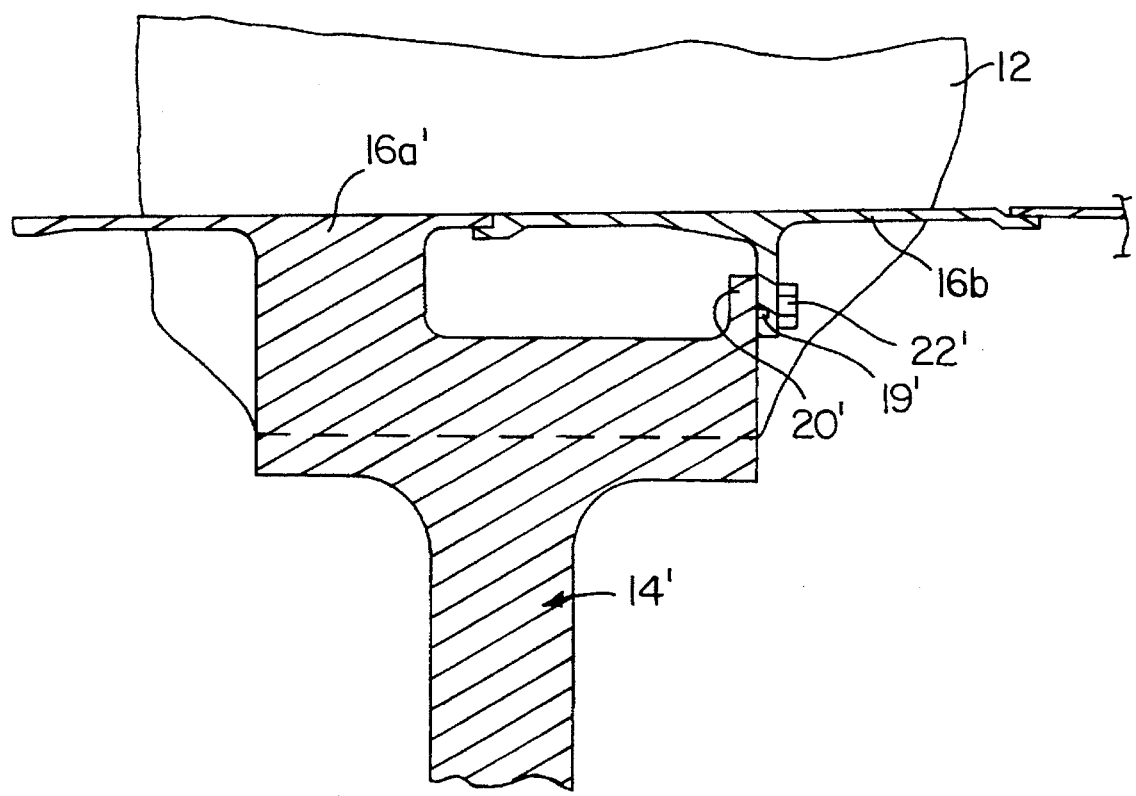
FIG. 2B is an enlarged part cross-sectional view of a fan blade, annulus filler and fan disk of the engine in FIG. 1, but with a different configuration than in FIG. 2A.

It will be noted by referring to FIGS. 1, 2A, 2B and 4, that the annulus fillers 16 are arranged at an acute angle to the engine axis. It is when a fan stage or a first stage of compressor blade having annulus fillers arranged in this manner, for whatever technical or aerodynamic reasons, that most benefit is derived from use of the present invention. Thus, use of a metal for the leading filler portion 16a and a composite material for the trailing portion 16b provides both a lighter structure than one which is made from a single piece of heavy, impact resistant material and a leading portion which will better resist damage by bearing the brunt of foreign body ingestion.

Where the annulus wall is substantially parallel with the engine axis, i.e. cylindrical (as seen in FIG. 2B), the advantage of light structure and easy replacement pertains. Protection against damage however is reduced, but not obviated, for when an aircraft powered by engines of the kind disclosed herein takes off, its attitude with respect to the ground is such as to effectively present the engine at a slope thereto and thus expose the outer surfaces of the lower leading portions 16a of the annulus fillers 16 to any ingested foreign objects. Note that FIG. 2B is similar in view of FIG. 2A, and like parts therein are denoted by the same reference numerals as in FIG. 2A, differentiated with the use of primes thereafter (for example, 14').

The preferred embodiment of the present invention is described and illustrated herein and includes shaping the rim of the disc 14 so as to provide the leading annulus filler portion 16a. However, individual portions (not shown) could be utilised and removably fixed in the same manner as the trailing portions 16b.

In FIG. 4 the dovetail roots 23 of the blades 12 and their complimentary grooves in the disc 14 are clearly seen.

Although the present invention has been described with reference to a rotary annulus wall filler in which an impact resistant metal leading portion and a trailing portion which is formed from a composite material, it will be appreciated that other material combinations could be employed. Thus the composite material trailing portion could be formed from a lightweight metal such as an aluminium alloy.

The present invention therefore provides a rotary annulus wall filler which has several advantages over previous such wall fillers. Firstly it permits the use of lightweight materials in applications in which heavy, impact resistant materials have been used in the part. Secondly it provides a way of reducing the distance between the rim of the fan disc 14 and the annulus wall. This is desirable because it results in an overall weight reduction in the stage of fan blades 12. Thirdly it permits the easy removal of individual fan blades 12 whilst the annulus fillers 16 remain in position in the disc 14.

We claim:

1. A gas turbine engine fan blade assembly comprising a rotary disc carrying an annular array of radially extending fan blades and a plurality of annulus wall fillers, one said annulus wall filler being interposed between adjacent fan blades, each annulus wall filler comprising a leading portion which is integral with said disc so that said disc and said leading portion define a unitary structure, and a lightweight trailing member which is attached to said disc and which is structurally separate from but in contact with said leading portion, wherein said disc and said leading portion are metallic and wherein said leading portion has an axial extent sufficient to be impacted by a majority of ingested debris, relative to said trailing member.

2. A gas turbine engine fan blade assembly as claimed in claim 1, wherein said trailing member of each annulus wall filler is formed from a composite material.

3. A gas turbine fan blade assembly as claimed in claim 1, wherein said annulus wall fillers collectively define a frusto-cone.

4. A gas turbine engine fan blade assembly as claimed in claim 1, wherein said annulus wall fillers collectively define a cylinder.

5. A gas turbine fan blade assembly as claimed in claim 1, wherein each said fan blade has a stub platform on at least one flank thereof, wherein each said stub platform extends for at least part of the chordal length of each said fan blade and is in alignment with an opposing edge of a side of an adjacent said annulus wall filler.

6. A gas turbine engine fan blade assembly as claimed in claim 1, wherein said trailing member is an annular member having axial length and having an internal surface and means on said internal surface for fastening said trailing member to said fan disc, said trailing member having a number of slots equally spaced about its circumference, said slots each having a width and shape complimentary to the width and shape of said fan blades.

* * * * *